(12) United States Patent
Kato

(10) Patent No.: US 9,438,156 B2
(45) Date of Patent: Sep. 6, 2016

(54) MOTOR CONTROL DEVICE AND MOTOR CONTROL METHOD

(71) Applicant: MITSUBISHI HEAVY INDUSTRIES, LTD., Tokyo (JP)

(72) Inventor: Yoshiki Kato, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 270 days.

(21) Appl. No.: 14/351,643

(22) PCT Filed: Oct. 1, 2012

(86) PCT No.: PCT/JP2012/075351
§ 371 (c)(1),
(2) Date: Apr. 14, 2014

(87) PCT Pub. No.: WO2013/058090
PCT Pub. Date: Apr. 25, 2013

(65) Prior Publication Data
US 2014/0292239 A1    Oct. 2, 2014

(30) Foreign Application Priority Data

Oct. 21, 2011 (JP) ................................. 2011-231884

(51) Int. Cl.
*H02P 21/00* (2016.01)
(52) U.S. Cl.
CPC ....... *H02P 21/0035* (2013.01); *H02P 21/0017* (2013.01); *H02P 21/18* (2016.02); *H02P 21/22* (2016.02)
(58) Field of Classification Search
CPC .. H02P 1/00; H02P 2101/00; H02P 2201/00; Y02T 10/643
See application file for complete search history.

(56) References Cited

U.S. PATENT DOCUMENTS

| 7,659,688 B2 | 2/2010 | Schulz et al. |
| 2006/0022628 A1* | 2/2006 | Okumatsu ............... H02P 23/14 318/437 |

(Continued)

FOREIGN PATENT DOCUMENTS

| CN | 101039093 | 9/2007 |
| CN | 101507101 | 8/2009 |

(Continued)

OTHER PUBLICATIONS

Extended European Search Report issued Oct. 13, 2015 in corresponding European Patent Application No. 12842231.8.

(Continued)

*Primary Examiner* — Shawki S Ismail
*Assistant Examiner* — Zoheb Imtiaz
(74) *Attorney, Agent, or Firm* — Wenderoth, Lind & Ponack, L.L.P.

(57) ABSTRACT

This motor control device generates a voltage command value from a current command value and performs feedback control by means of a detected current flowing through a motor. The motor control device is provided with: a correction control unit that, when the motor is being rotated at a set speed, sets a d-axis current command value and a q-axis current command value to each be zero; a current control unit that generates the integrated value of the deviation between the current command value and the detected current; and an integrated value measurement unit that measures the generated integrated value. The correction control unit adjusts the correction value for the rotational position of the motor by adjusting in a manner so that the measured integrated value becomes a value within a pre-determined range.

6 Claims, 11 Drawing Sheets

(56) References Cited

U.S. PATENT DOCUMENTS

| | | | | |
|---|---|---|---|---|
| 2007/0024232 A1* | 2/2007 | Suzuki | ............... | H02P 21/22 318/812 |
| 2010/0156330 A1* | 6/2010 | Inoue | ............... | B60L 11/14 318/400.02 |
| 2011/0031912 A1* | 2/2011 | Hong | ............... | H02P 6/10 318/400.04 |
| 2013/0221885 A1* | 8/2013 | Hunter | ............... | H02P 21/0003 318/400.15 |

FOREIGN PATENT DOCUMENTS

| | | |
|---|---|---|
| CN | 101981805 | 2/2011 |
| EP | 2 200 171 | 6/2010 |
| JP | 6-165561 | 6/1994 |
| JP | 8-182399 | 7/1996 |
| JP | 8-331883 | 12/1996 |
| JP | 9-47066 | 2/1997 |
| JP | 9-56199 | 2/1997 |
| JP | 10-262398 | 9/1998 |
| JP | 11-168895 | 6/1999 |
| JP | 2000-166278 | 6/2000 |
| JP | 2000-166300 | 6/2000 |
| JP | 2001-8486 | 1/2001 |
| JP | 2001-8499 | 1/2001 |
| JP | 2001-128484 | 5/2001 |
| JP | 2001-197767 | 7/2001 |
| JP | 2001-309694 | 11/2001 |
| JP | 2002-136168 | 5/2002 |
| JP | 2002-238278 | 8/2002 |
| JP | 2002-374692 | 12/2002 |
| JP | 2003-79185 | 3/2003 |
| JP | 2004-129359 | 4/2004 |
| JP | 2004-266935 | 9/2004 |
| JP | 2004-289959 | 10/2004 |
| JP | 2005-218257 | 8/2005 |
| JP | 2006-33993 | 2/2006 |
| JP | 3789895 | 6/2006 |
| JP | 2006-238601 | 9/2006 |
| JP | 2009-100615 | 5/2009 |
| JP | 2010-148271 | 7/2010 |
| JP | 2011-172382 | 9/2011 |
| WO | 2011/054032 | 5/2011 |

OTHER PUBLICATIONS

International Search Report issued Dec. 18, 2012 in International Application No. PCT/JP2012/075351 with English translation.
Written Opinion of the International Searching Authority issued Dec. 18, 2012 in International Application No. PCT/JP2012/075351 with English translation.
Office Action issued Jan. 27, 2016 in Chinese Application No. 201280062593.3, with English translation.

* cited by examiner

WHEN $Vd_C$ IS USED, ADJUSTMENT PRECISION DETERIORATES DUE TO
INFLUENCE OF NOISE OR HARMONICS, ONLY −1.0° IS CORRECTED WITH
RESPECT TO +1.7° WHICH IS OFFSET OF ACTUAL DEVICE,
AND THUS PRECISION DETERIORATES.

MOTOR CONTROL DEVICE AND MOTOR CONTROL METHOD

TECHNICAL FIELD

The present invention relates to a motor control device and a motor control method.

Priority is claimed on Japanese Patent Application No. 2011-231884, filed Oct. 21, 2011, the content of which is incorporated herein by reference.

BACKGROUND ART

When a 3-phase brushless motor is controlled, the 3-phase brushless motor is not controlled on 3 phases of U, V, and W, but is generally controlled on 2 phases of d and q axes by performing coordinate conversion of the 3 phases of U, V, and W into biaxial coordinates of d and q axes.

Here, an overview of dq vector control by which the coordinate conversion into biaxial coordinates of the d and q axes is performed will be described. In the dq vector control, a motor control process is performed by an equivalent circuit on a dq coordinate system in which a field direction of a rotor is the d axis and the direction orthogonal to the field direction is the q axis. A motor control device controlling such a motor controls a d-axis command voltage Vd* and a q-axis command voltage Vq* through feedback control such that a detection current Id of the d axis and a detection current Iq of the q axis follow a d-axis command current Id* and a q-axis command current Iq* using, for example, proportional integral (PI) control.

As an angle detector detecting a rotation angle position of a rotor included in such a motor, an angle detector detecting a rotation angle by combining a resolver and an angle detection circuit is used. The resolver is a rotation detection device that detects a rotation angle of a rotor by a phase difference between a rotor coil and a stator coil. The resolver generates a magnetic field by applying a sinusoidal signal (E sin($\omega$t) (where E is an amplitude of a sinusoidal wave and $\omega$ is an excitation frequency)) to the rotor coil. In the magnetic field, a voltage (KE sin($\omega$t)×sin($\theta$), KE sin($\omega$t)×cos($\theta$)) having a phase difference between two stator coils orthogonal to each other is produced in the two stator coils. A rotation angle $\theta$ is detected using outputs of the stator coils. Then, the motor control device controls a current of the motor based on the detected rotation angle $\theta$.

However, in the motor in which such an angle detector is assembled, for example, an error due to manufacturing precision of a resolver between rotation positions of the angle detector and a synchronous motor or an error due to the assembly of the resolver may be caused.

For this reason, the motor control device disclosed in Patent Literature 1 rotates a motor from the outside by setting current command values of the d and q axes to 0. In this case, an induced voltage is generated in the motor, but the motor control device controls the motor such that the current becomes 0. Therefore, the motor control device controls the motor such that a d-axis current Id and a q-axis current Iq become 0. Therefore, when there is no deviation in a phase between the angle detector and the rotation position of the synchronous motor, only a q-axis voltage Vq is generated and a d-axis voltage Vd becomes 0.

However, when there is deviation in the phase between the angle detector and the rotation position of the synchronous motor, the d-axis voltage Vd is generated. The motor control device disclosed in Patent Literature 1 obtains a d-axis command voltage Vd* and a q-axis command voltage Vq* so that the d-axis current Id and the q-axis current Iq become 0, and calculates an offset amount $\Delta\theta$ so that the obtained d-axis command voltage Vd* becomes 0. Further, the motor control device disclosed in Patent Literature 1 corrects the deviation occurring between the angle detector and the rotation position of the synchronous motor using the calculated offset amount.

Also, a motor control device disclosed in Patent Literature 2 rotates a motor by controlling a q-axis current Iq to 0 so that a d-axis current Id flows. In this case, the q-axis current Iq is a current by which torque is generated and the d-axis current Id is an excitation current. Therefore, in the case in which there is no deviation between an angle detector and the rotation position of a synchronous motor, no torque is generated even when the q-axis current Iq is set to 0 and the d-axis current Id flows. However, in the case in which there is the deviation between the angle detector and a rotation position of the synchronous motor, torque is generated when the q-axis current Iq is set to 0 and the d-axis current Id flows. For this reason, in the motor control device disclosed in Patent Literature 2, deviation occurring due to an embedded-position aberration between the angle detector and a rotation position of the synchronous motor, a manufacture error, or the like is corrected by adjusting the torque so that the torque becomes 0 when the q-axis current Iq is controlled to 0 and the motor is rotated by flowing the d-axis current Id.

PRIOR ART LITERATURE

Patent Literature

[Patent Literature 1]
 Japanese Patent No. 3789895
[Patent Literature 2]
 Japanese Unexamined Patent Application, First Publication No. 2002-374692

DISCLOSURE OF INVENTION

Problems to be Solved by the Invention

In the technology disclosed in Patent Literature 1, however, the coordinate conversion into the biaxial coordinates of the d and q axes is performed using a converter that converts a detection signal from 2 phases to 3 phases. On the other hand, in the technology disclosed in Patent Literature 1, delay occurs even in a pulse width modulation (PWM) converter driving a motor based on a generated command value. For this reason, in the technology disclosed in Patent Literature 1, the delay occurs between outputs of the angle detector and a PWM converter in some cases. As a result, in the technology disclosed in Patent Literature 1, there is a problem that the motor may not be controlled with high precision since the delay value has an influence of precision of offset adjustment. Also, in the technology disclosed in Patent Literature 1, an offset adjustment amount is calculated from a command voltage value. However, since a command voltage is easily affected by noise or a high-frequency wave, the problem that the motor may not be controlled with high precision occurs.

Also, in the technology disclosed in Patent Literature 2, correction is performed using torque. Therefore, when there is friction in the motor and a load connected to the motor, the friction has an influence on the torque and an error occurs in a corrected value, and thus the problem that the motor may not be controlled with high precision occurs.

The present invention is devised in view of the above-mentioned problems and an object of the present invention is to provide a motor control device and a motor control method capable of controlling a motor with high precision.

Means for Solving the Problems

In order to achieve the foregoing object, according to an aspect of the present invention, there is provided a motor control device generating a voltage command value from a current command value and performing feedback control using a detection current flowing in a motor. The motor control device includes: a correction control unit configured to set a d-axis current command value and a q-axis current command value to 0 when the motor is rotated at a constant velocity; a current control unit configured to generate integral values of deflection between the current command value and the detection current; and an integral value measurement unit configured to measure the generated integral values. The correction control unit adjusts a correction value at a rotation position of the motor by performing adjustment so that the measured integral value becomes a value within a range determined in advance.

In the motor control device according to the aspect of the present invention, the correction control unit may generate a value indicating the rotation position by adding the adjusted correction value and a detection value corresponding to the rotation position of the motor. Based on the generated value indicating the rotation position, the current control unit may perform control such that the detection current flowing in the motor becomes the current command value.

In the motor control device according to the aspect of the present invention, the correction control unit may perform control such that the integrated value of d-axis current deflection between the measured integral values becomes 0 by performing proportional integral control on deflection between the integral value of the d-axis current deflection and 0.

In the motor control device according to the aspect of the present invention, based on a correction value for adjustment generated by the correction control unit, the current control unit may perform control such that the detection current flowing in the motor becomes the current command value. The integral value measurement unit may measure each of the integral values at a time of the generated correction value for the adjustment. The correction control unit may generate at least two correction values for the adjustment, calculate an approximate formula based on the integral value of each of the corrections values for the adjustment measured by the integral value measurement unit, and calculate the correction value at the rotation position of the motor using the calculated calculation formula.

In the motor control device according to the aspect of the present invention, the correction control unit may perform advancement angle correction of a dq coordinate system before the calculation of the correction value at the rotation position of the motor by the number of times the motor is rotated at the constant velocity.

In order to achieve the foregoing object, according to an aspect of the present invention, there is provided a motor control method of a motor control device generating a voltage command value from a current command value and performing feedback control using a detection current flowing in a motor. The motor control method includes: a correction control procedure of setting, by a correction control unit, a d-axis current command value and a q-axis current command value to 0 when the motor is rotated at a constant velocity; a current control procedure of generating, by a current control unit, integral values of deflection between the current command value and the detection current; an integral value measurement procedure of measuring, by an integral value measurement unit, the generated integral values; and a procedure of adjusting, by the correction control unit, a correction value at a rotation position of the motor by performing adjustment so that the measured integral value becomes a value within a range determined in advance.

Effects of the Invention

According to the present invention, the integral value of the current deflection is measured when the motor is rotated at the constant velocity, the correction value at the rotation position of the motor is adjusted based on the measured integral value of the current deflection, and the rotation of the motor is controlled using the adjusted correction value. As a result, even when the detected rotation position deviates, the motor can be controlled with high precision.

PREFERRED EMBODIMENTS FOR CARRYING OUT THE INVENTION

Figure 1:
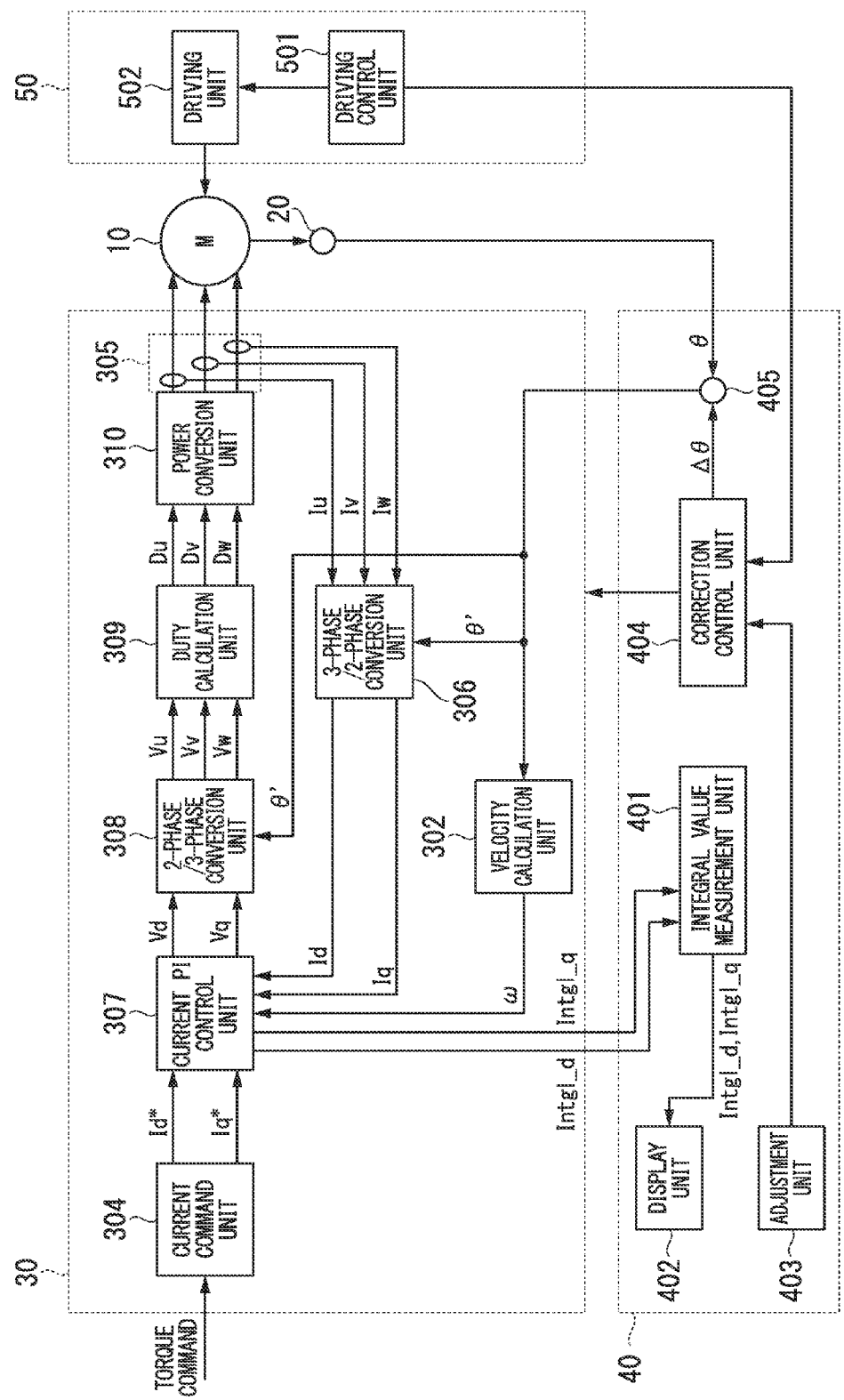
FIG. 1 is a control block diagram illustrating a motor control device according to a first embodiment.

Hereinafter, embodiments of the present invention will be described in detail with reference to the drawings. Also, the present invention is not limited to related embodiments, but may be modified in various forms within the scope of the technical spirit and essence.

First, an overall operation of a motor control device will be described.

The motor control device is a device that is supplied with power from a battery cell and controls a motor, for example, in an industrial vehicle, an electric vehicle, a hybrid vehicle, an electric train, a ship, an airplane, and a power generation system.

In an electric vehicle using an electric motor as motive power or a hybrid vehicle (hereinafter referred to as "an electric vehicle or the like") using an internal-combustion engine and an electric motor together as motive power, to improve power use efficiency, a motor control device uses pulse width modulation (PWM) control such that a pulse width is modulated when a 3-phase driving current is controlled.

In an electric vehicle or the like, a permanent magnet synchronous motor is mainly used and a 3-phase current synchronized with rotation flows in this motor. To perform PWM control on the 3-phase current, an electric pulse with a constant frequency which is called a carrier signal is used. In this case, a driving current is supplied with a rectangular wave with a modulated pulse width to the motor in accordance with a timing of the carrier signal and becomes a 3-phase current of a sinusoidal wave by an inductance of the motor.

In such a motor control device, a current flowing in the motor is controlled through proportional integral (PI) control using feedback so that the torque of an input torque command is obtained. Also, in the PI control, 3 phases of u, v, and w to be supplied to the motor are subjected to coordinate conversion to obtain biaxial coordinates of d and q axes and control is performed on 2 phases of the d and q axes. Also, in such a motor control device, a resolver which is an angle detection device detecting a rotation angle of the motor is assembled. Further, in the PI control of a current, the motor is controlled by generating a current command value based on a detected rotation angle of the motor and an input torque command and performing control such that the generated current command value matches a measured value of the current flowing in the motor.

The biaxial coordinates of the d and q axes (hereinafter referred to as a dq coordinate system) are a rotation coordinate system and are represented as a dq coordinate system that has a d axis in the direction of a magnetic flux produced by a permanent magnet forming a rotor and a q axis of which a phase is advanced 90 degrees from the d axis. Further, the dq coordinate system is rotated and a rotation velocity is an angular velocity ω. In the dq coordinate system, a d-axis component and a q-axis component of a voltage V of the motor are represented by Vd and Vq, respectively. Also, in the dq coordinate system, a d-axis component and a q-axis component of a current I of the motor are represented by Id and Iq, respectively.

Next, an overview of the present invention will be described.

In a motor control system, an error due to assembling precision of a resolver, an error due to manufacturing of the resolver, an error due to processing delay of a detection signal by the resolver, or the like (hereinafter referred to as an error due to the resolver) occurs. To correct such an error, in the motor control system according to the present invention, a motor is rotated at a constant velocity from the outside.

When the motor is constantly rotated and a d-axis current command and a q-axis current command are each set to 0, only noise or the like flows at a d-axis current and q-axis current in an actual operation, only the q-axis voltage occurs, and the d-axis voltage becomes 0. However, an error due to the resolver occurs, and thus an angle deviation of the dq coordinate system occurs in coordinates in an actual operation and coordinates in the motor control device. Thus, when there is the angle deviation of the dq coordinate system in the actual operation and the motor control device, the phase of an excitation voltage vector ωΦa appears to deviate and an angle of the voltage vector of the motor is affected in the motor control device. As a result, the d-axis voltage does not become 0 and a voltage according to an angle of a voltage vector occurs.

Based on such a principle, in the motor control system according to the present invention, an integral value of deflection between the d-axis current command value and the detection current is measured when the motor is rotated at a constant velocity. Further, in the motor control system according to the present invention, an offset correction value is adjusted so that the measured integral value of the deflection between the d-axis current command value and the detection current becomes 0.

[First Embodiment]

In a first embodiment, the motor is rotated at a constant velocity from the outside. When the motor is rotated at the constant velocity in this way, a motor control device according to the present embodiment measures an integral value of d-axis current deflection and an integral value of q-axis current deflection and adjusts the offset correction value. Hereinafter, the first embodiment will be described in detail.

FIG. 1 is a control block diagram illustrating the motor control system according to the present embodiment.

As illustrated in FIG. 1, a motor control system 1 according to the present embodiment includes a resolver 20, a motor control device 30, and an offset correction device 40.

The motor control device 30 includes a velocity calculation unit 302, a current command unit 304, a current detector 305, a 3-phase/2-phase conversion unit 306, a current PI control unit 307 (current control unit), a 2-phase/3-phase conversion unit 308, a duty calculation unit 309, and a power conversion unit 310.

The offset correction device 40 includes an integral value measurement unit 401, a display unit 402, an adjustment unit 403, a correction control unit 404, and an addition unit 405.

Also, the motor control device 30 is connected to the motor 10 and the offset correction device 40. A driving control device 50 includes a driving control unit 501 and a driving unit 502. The driving control device 50 is also connected to the motor 10.

The motor 10 is a 3-phase motor and is driven by a driving current output from the power conversion unit 310. The resolver 20 is assembled in the motor 10.

The resolver 20 is assembled in the motor 10. The resolver 20 detects a rotation angle (or a rotation position) of the motor 10 at each instant at each sampling time (hereinafter, a detected rotation angle is referred to as a detection angle) and outputs the detected detection angle to the addition unit 405 of the offset correction device 40. Also, a sampling frequency is, for example, 5 [kHz].

The velocity calculation unit 302 calculates an angular velocity ω of the rotor of the motor 10 from an angle measurement signal θ' output by the addition unit 405 and outputs the calculated angular velocity ω to the current PI control unit 307.

The angular velocity ω output from the velocity calculation unit 302 and the torque command value τ* output from the outside are input to the current command unit 304. The current command unit 304 generates a current command value Id* of the d axis and a current command value Iq* of the q axis (hereinafter referred to as a d-axis current command value and a q-axis current command value) which are 2-phase command currents having the d-axis component and the q-axis component, from the torque command value τ* and the angular velocity ω. The current command unit 304 outputs the generated d-axis current command value Id* and q-axis current command value Iq* to the current PI control unit 307.

The current detector 305 detects 3-phase currents Iu, Iv, and Iw for the motor 10 and outputs the detected currents Iu, Iv, and Iw of 3 phases to the 3-phase/2-phase conversion unit 306.

The 3-phase/2-phase conversion unit 306 converts the currents Iu, Iv, and Iw of the 3 phases output by the current detector 305 into a d-axis component Id and a q-axis component Iq (hereinafter referred to as detection currents) of 2 phases. The 3-phase/2-phase conversion unit 306 outputs the converted detection currents Id and Iq to the current PI control unit 307. Also, a current (d-axis current) of the d-axis component refers to a component (excitation current component) used to generate a magnetic flux in the motor 10 in a flowing current when the d axis is in the direction of the magnetic flux. Also, a current (q-axis current) of the q-axis component refers to a component corresponding to torque of a load among the flowing currents.

The d-axis current command value Id* and the q-axis current command value Iq* output by the current command unit 304, the detection currents Id and Iq output by the 3-phase/2-phase conversion unit 306, and the angular velocity ω output by the velocity calculation unit 302 are input to the current PI control unit 307. The current PI control unit 307 controls the current Iu, Iv, and Iw flowing in the motor 10 such that the detection currents Id and Iq which are control variables become values according to the d-axis current command value Id* and the q-axis current command value Iq*. Also, the current PI control unit 307 performs non-interactive control using the d-axis current command value Id*, the q-axis current command value Iq*, the angular velocity ω, and the like, as will be described below.

The current PI control unit 307 calculates deflection ΔId and ΔIq by subtracting the detection currents Id and Iq from the input d-axis current command value Id* and q-axis current command value Iq*, respectively. The current PI control unit 307 calculates a voltage command value Vd* of the d axis and a voltage command value Vq* of the q axis (hereinafter referred to as a d-axis voltage command value and a q-axis voltage command value), which are command voltages, using the calculated deflection ΔId and ΔIq by the following equations (1) and (2). Also, in the present embodiment, since the current PI control is performed, the d-axis voltage command value Vd* is the same as a voltage Vd and the q-axis voltage command value Vq* is the same as a voltage Vq. Therefore, in the present embodiment, the d-axis voltage command value Vd* and the q-axis voltage command value Vq* are represented as the d-axis voltage command value Vd and the q-axis voltage command value Vq, respectively.

The current PI control unit 307 outputs the calculated d-axis voltage command value Vd and q-axis voltage command value Vq to the 2-phase/3-phase conversion unit 308.

$$Vd^* = Kp \times \Delta Id + Ki \times \int (\Delta Id) dt \quad (1)$$

$$Vq^* = Kp \times \Delta Iq + Ki \times \int (\Delta Iq) dt \quad (2)$$

Also, in equations (1) and (2), coefficients Kp and Ki are coefficients set in advance. Further, in equations (1) and (2), terms of a non-interactive control unit are excluded.

The 2-phase/3-phase conversion unit 308 calculates voltage command values Vu*, Vv*, and Vw* of the 3-phases by performing coordinate conversions on the d-axis voltage command value Vd and the q-axis voltage command value Vq output by the current PI control unit 307 using the angle measurement signal θ' output by the addition unit 405. Since the current PI control is performed as in the current PI control unit 307 and the voltage command values Vu*, Vv*, and Vw* are the same as voltages Vu, Vv, and Vw, the voltage command values are represented as Vu, Vv, and Vw.

The 2-phase/3-phase conversion unit 308 outputs the calculated voltage command values Vu, Vv, and Vw of the 3 phases to the duty calculation unit 309.

The voltage command values Vu, Vv, and Vw of the 3 phases output by the 2-phase/3-phase conversion unit 308 are input to the duty calculation unit 309. The duty calculation unit 309 calculates duty signals Du, Dv, and Dw representing driving current signals to be provided to the motor from the voltage command values Vu, Vv, and Vw of the 3 phases at a timing determined by a carrier frequency fc. The duty calculation unit 309 outputs the calculated duty signals Du, Dv, and Dw to the power conversion unit 310.

The power conversion unit 310 includes, for example, a power control element (power element) such as an insulated gate bipolar transistor (IGBT) element that performs switching to generate driving currents from the duty signals Du, Dv, and Dw. The power conversion unit 310 generates the driving currents of the 3 phases corresponding to the duty signals Du, Dv, and Dw output by the duty calculation unit 309 and supplies the generated driving currents of the 3 phases to the motor 10.

The integral value measurement unit 401 of the offset correction device 40 measures an integral value Intgl_d of the d-axis current deflection and an integral value Intgl_q of the q-axis current deflection which are internal data of the current PI control unit 307. The integral value measurement unit 401 outputs the measured integral value Intgl_d of the d-axis current deflection and integral value Intgl_q of the q-axis current deflection to the display unit 402. Also, the integral value Intgl_d of the d-axis current deflection is an integral value of deflection between the d-axis current command value Id* and the detected d-axis current value Id, as will be described below. Likewise, the integral value Intgl_q of the q-axis current deflection is an integral value of deflection between the q-axis current command value Iq* and the detected q-axis current value Iq.

The display unit 402 displays numerical values of the integral value Intgl_d of the d-axis current deflection and the integral value Intgl_q of the q-axis current deflection output by the integral value measurement unit 401. Alternatively, the display unit 402 may display the integral value Intgl_d of the d-axis current deflection and the integral value Intgl_q of the q-axis current deflection output by the integral value measurement unit 401 by a lamp or the like installed in each range determined in advance. The display unit 402 may set a range considered as 0 in advance by actual measurement and turn on the lamp indicating determination of OK when the integral value Intgl_d of the d-axis current deflection is within the set range.

The user performing offset adjustment adjusts the correction value and the adjustment unit 403 outputs the adjusted correction value to the correction control unit 404. Specifically, the user performing the offset adjustment adjusts the correction value, for example, by a volume or the like based on the integral value Intgl_d of the d-axis current deflection and the integral value Intgl_q of the q-axis current deflection displayed on the display unit 402 and adjusts the offset adjustment value through the correction control unit 404.

Based on information indicating a driving state output by the driving control device 50, the correction control unit 404 determines whether the motor 10 is rotated at the constant velocity by the driving control device 50. When the correction control unit 404 determines that the motor 10 is rotated at the constant velocity, the correction control unit 404 fixes each of the d-axis current command value Id* and the q-axis current command value Iq* of the motor control device 30 to 0 and performs control such that a servo is turned on.

The correction control unit 404 generates the offset correction value based on the correction value output by the adjustment unit 403 and outputs the generated offset correction value to the addition unit 405.

Also, the offset correction value after the offset adjustment may be stored in a storage unit (not illustrated) of the motor control device 30 or the offset correction device 40.

The addition unit 405 adds the detection signal θ output by the resolver 20 and the offset correction value Δθ output by the correction control unit 404 and outputs an added signal as the angle measurement signal θ' to the velocity calculation unit 302, the 3-phase/2-phase conversion unit 306, and the 2-phase/3-phase conversion unit 308.

The driving control unit 501 of the driving control device 50 generates a driving signal by which the driving unit 502 is rotated at a constant velocity and outputs the generated driving signal to the driving unit 502. For example, when the motor control device 30 is mounted on a vehicle (not illustrated), the driving control unit 501 generates a driving signal by which the motor is rotated at a constant velocity by an engine (the driving unit 502) mounted on the vehicle and is controlled in an idling state at the time of offset adjustment.

The driving unit 502 drives the motor 10 according to the driving signal output by the driving control unit 501. For example, when the motor control device 30 is mounted on a vehicle (not illustrated), the driving unit 502 is an engine mounted on the vehicle.

Figure 2:
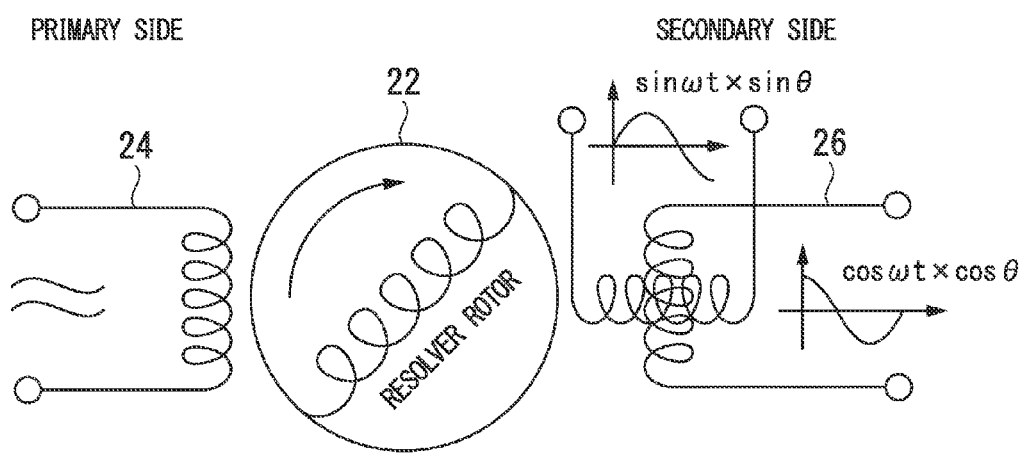
FIG. 2 is a diagram illustrating an overall constitution of a resolver according to the first embodiment.

FIG. 2 is a diagram illustrating an overall constitution of the resolver 20 according to the present embodiment.

As illustrated in FIG. 2, the resolver 20 is mounted on a through shaft of the motor 10 and is adjusted in accordance with a rotor magnetic field of the brushless motor. The resolver 20 includes a resolver rotor 22, a primary-side coil (rotor) 24, and two secondary-side coils (stator) 26 separated by 90 degrees from the primary side coil 24. When an alternating current is applied to the primary side, a voltage is also generated in the secondary-side coils. The amplitude of a voltage output to the secondary side is sin θ and cos θ when θ is a rotor angle.

The resolver 20 calculates a detection angle of the motor 10 based on signals of the secondary-side coils 26. The calculated detection angle has a monotonically and substantially linearly increasing value since inertia is large in an electric vehicle or the like and acceleration is negligible compared to a sampling time between one rotation (360 degrees) and a rotation criterion angle (0 degrees) of an electric angle of the motor 10. Accordingly, calculated values during a plurality of rotations of the motor 10 form, for example, a toothed wave shape. The resolver 20 can detect the detection angle of the electric angle of the motor 10 by the calculated values.

Figure 3:
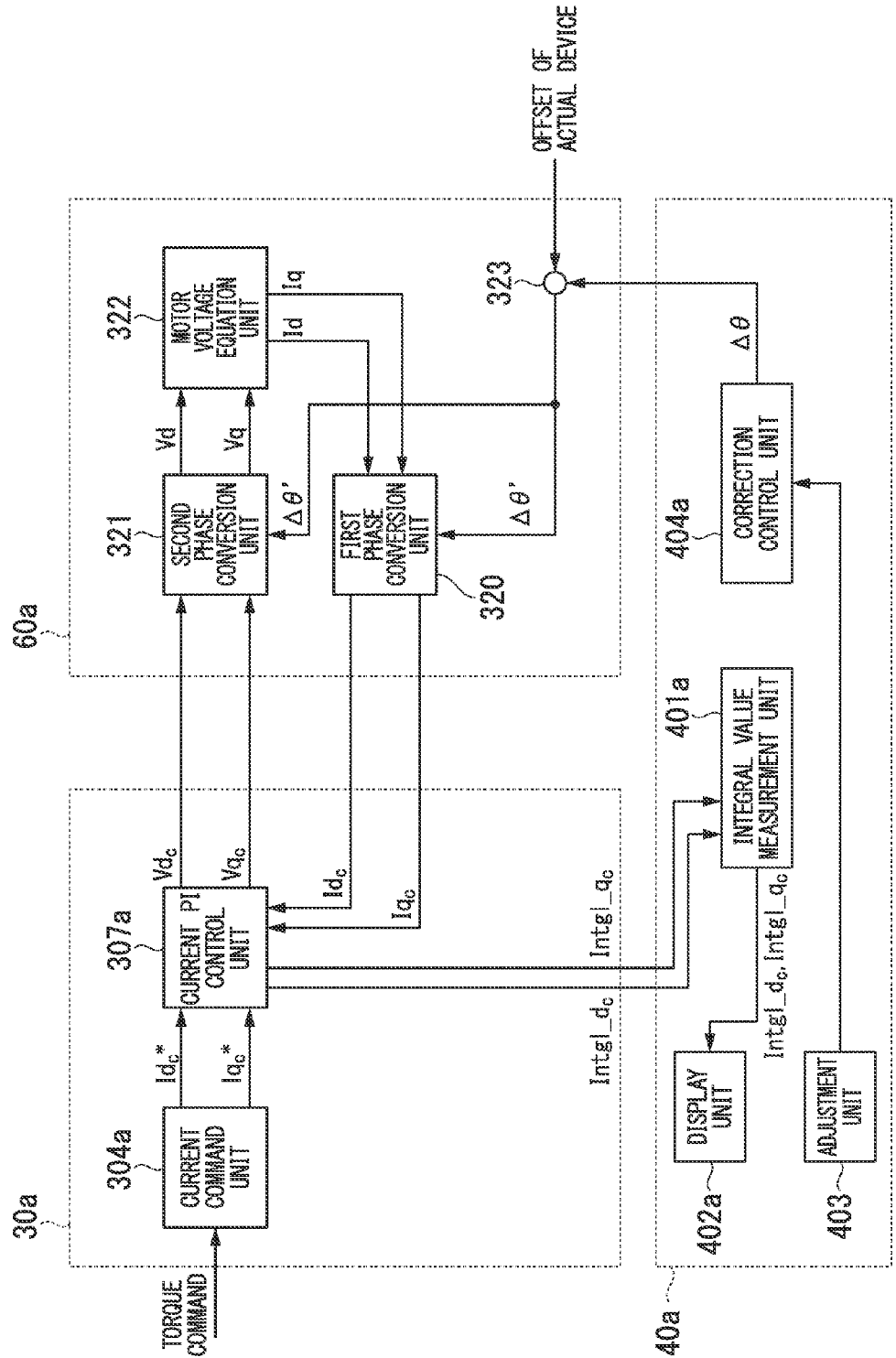
FIG. 3 is a control block diagram in a dq coordinate system and a control system $d_c q_c$ coordinate system according to the first embodiment.

FIG. 3 is a control block diagram in a dq coordinate system and a control system $d_c q_c$ coordinate system according to the present embodiment.

An offset value Δθ' is a value of (an offset correction value Δθ+an offset error of an actual device) and indicates a phase difference between the dq coordinate system and the $d_c q_c$ coordinate system.

The control system $d_c q_c$ coordinate system refers to a coordinate system expressed by substituting the d and q axes in a motor control device 30a with $d_c$ and $q_c$ axes, respectively.

As illustrated in FIG. 3, the motor control device 30a includes a current command unit 304a and a current PI control unit 307a in the control system $d_c q_c$ coordinate system. A portion expressing the motor 10 and the resolver 20 of a control target 60a in the d and q axes of the actual coordinates includes a first phase conversion unit 320, a second phase conversion unit 321, and a motor voltage equation unit 322.

An offset correction device 40a includes an integral value measurement unit 401a, a display unit 402a, an adjustment unit 403, and a correction control unit 404a.

The same operation units as those in FIG. 1 are denoted by the same reference numerals and the description thereof will be omitted.

The torque command value τ* input from the outside is input to the current command unit 304a of the motor control device 30a. The current command unit 304a generates a $d_c$-axis current command value $Id_c$* and a $q_c$-axis current command value $Iq_c$* from the torque command value τ*. The current command unit 304a outputs the generated $d_c$-axis current command value $Id_c$* and $q_c$-axis current command value $Iq_c$* to the current PI control unit 307a.

The current PI control unit 307a calculates a $d_c$-axis voltage command value $Vd_c$ and a $q_c$-axis voltage command value $Vq_c$ from the input d-axis current command value $Id_c$* and q-axis current command value $Iq_c$* based on a $d_c$-axis current $Id_c$ and a $q_c$-axis current $Iq_c$.

The first phase conversion unit 320 of the control target 60a is a conversion unit from a current of the d and q axes into a current of the $d_c$ and $q_c$ axes. The first phase conversion unit 320 is subjected to coordinate conversion by the offset value Δθ' so that a d-axis current Id and a q-axis current Iq are converted into a $d_c$-axis current $Id_c$ and a $q_c$-axis current $Iq_c$, respectively. The first phase conversion unit 320 outputs the converted $d_c$-axis current $Id_c$ and $q_c$-axis current $Iq_c$ to the current PI control unit 307a.

In the present embodiment, since control is performed at the time of the offset adjustment such that the d-axis current Id, the q-axis current Iq, the $d_c$-axis current $Id_c$ of the control system coordinates, and the $q_c$-axis current $Iq_c$ of the control system coordinates become 0, the first phase conversion unit 320 may not consider these currents at the time of the offset adjustment.

The second phase conversion unit 321 is a conversion unit from a voltage of the $d_c$ and $q_c$ axes to a voltage of the d and q axes. The second phase conversion unit 321 is subjected to coordinate conversion by an offset value Δθ' so that a $d_c$-axis voltage $Vd_c$ and a $q_c$-axis voltage $Vq_c$ are converted into a d-axis voltage Vd and a q-axis voltage Vq, respectively. The second phase conversion unit 321 outputs the converted d-axis voltage Vd and q-axis voltage Vq to the motor voltage equation unit 322.

Here, when a delay value |ω|Δt is omitted, the second phase conversion unit 321 is expressed as in the following equation (3).

[Math. 1]

$$\begin{bmatrix} Vd \\ Vq \end{bmatrix} = \begin{bmatrix} \cos(\Delta\theta') & -\sin(\Delta\theta') \\ \sin(\Delta\theta') & \cos(\Delta\theta') \end{bmatrix} \begin{bmatrix} Vd_c \\ Vq_c \end{bmatrix} \quad (3)$$

The d-axis voltage Vd and the q-axis voltage Vq output by the second phase conversion unit 321 are input to the motor voltage equation unit 322.

A voltage equation of the motor 10 included in the motor voltage equation unit 322 is expressed as in the following equation (4) (for example, see Reference Document 1: Vector Control Technology of Permanent Magnet Synchronous Motor, First Volume, by Shinji Shinnaka p 98 published in 2008 by Dempa Publications, Inc.).

[Math. 2]

$$\begin{bmatrix} Vd \\ Vq \end{bmatrix} = \begin{bmatrix} Ra + pLd & -\omega Lq \\ \omega Ld & Ra + pLq \end{bmatrix} \begin{bmatrix} Id \\ Iq \end{bmatrix} + \begin{bmatrix} 0 \\ \omega \Phi a \end{bmatrix} \quad (4)$$

In equation (4), ω is an angular velocity, Φa is an interlinkage magnetic flux of the motor 10, and ωΦa is an induced voltage. Ld is inductance of the d axis and Lq is inductance of the q axis. Ra is resistance per wiring one-phase of the motor 10.

Also, in equation (4), p is a differential operator. Therefore, in a steady state, equation (4) is expressed as in the following equation (5).

[Math. 3]

$$\begin{bmatrix} Vd \\ Vq \end{bmatrix} = \begin{bmatrix} Ra & -\omega Lq \\ \omega Ld & Ra \end{bmatrix} \begin{bmatrix} Id \\ Iq \end{bmatrix} + \begin{bmatrix} 0 \\ \omega \Phi a \end{bmatrix} \quad (5)$$

The motor voltage equation unit 322 calculates the d-axis current Id and the q-axis current Iq using equation (4) or (5) and outputs the calculated d-axis current Id and q-axis current Iq to the first phase conversion unit 320.

The integral value measurement unit 401a of the offset correction device 40a measures an integral value Intgl_$d_c$ of $d_c$-axis current deflection and an integral value Intgl_$q_c$ of $q_c$-axis current deflection which are internal data of the current PI control unit 307a. The integral value measurement unit 401a outputs the measured integral value Intgl_$d_c$ of $d_c$-axis current deflection and integral value Intgl_$q_c$ of $q_c$-axis current deflection to the display unit 402a.

The display unit 402a displays the integral value Intgl_$d_c$ of $d_c$-axis current deflection and the integral value Intgl_$q_c$ of $q_c$-axis current deflection output by the integral value measurement unit 401a.

The correction control unit 404a generates an offset correction value based on the correction value output by the adjustment unit 403 and outputs the generated offset correction value to the control target 60a.

Next, an overall configuration of the current PI control unit 307a will be described with reference to FIG. 4.

Figure 4:
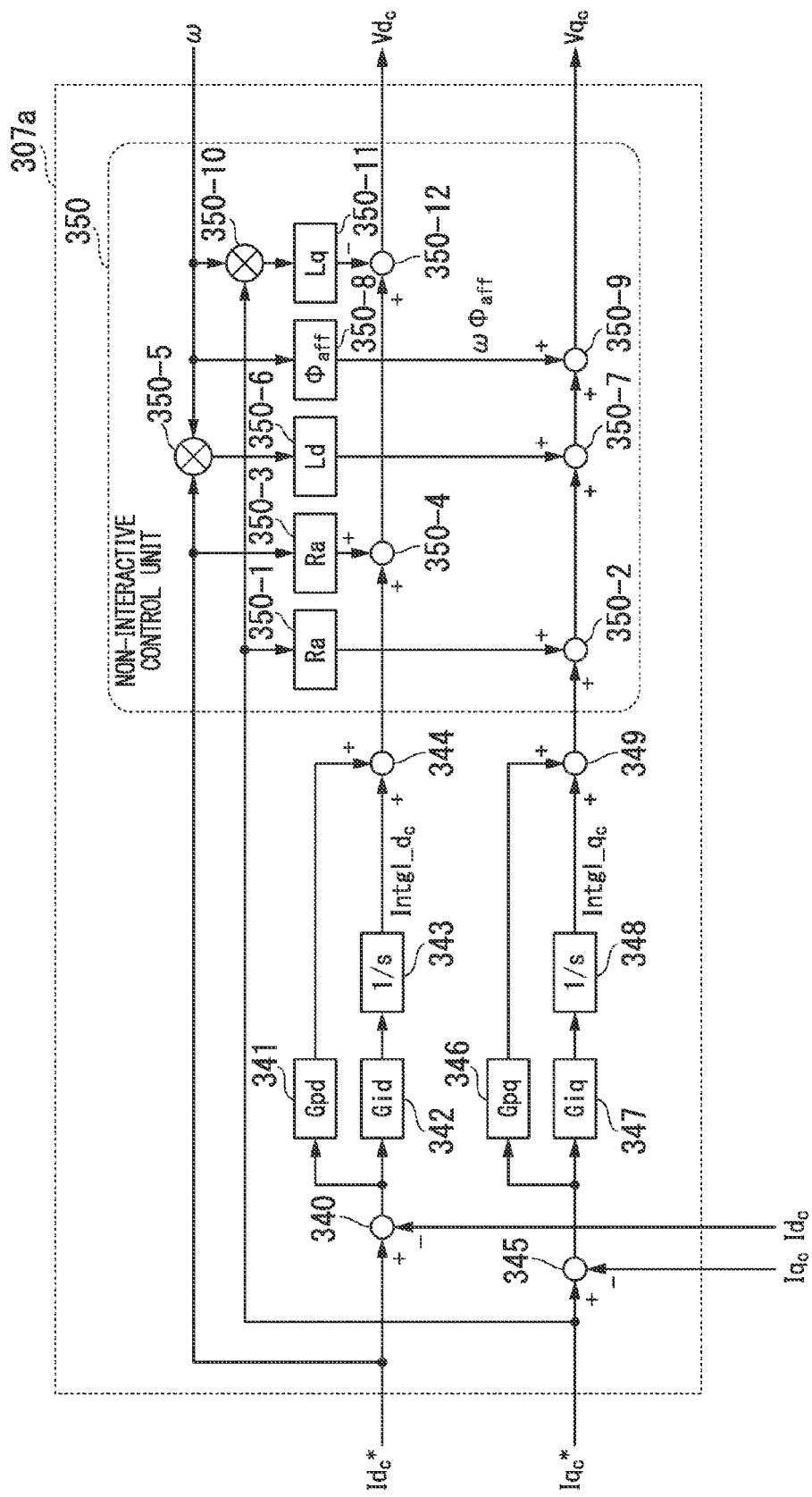
FIG. 4 is a block diagram illustrating a current PI control unit according to the first embodiment.

FIG. 4 is a block diagram illustrating the current PI control unit 307a according to the present embodiment.

As illustrated in FIG. 4, the current PI control unit 307a includes addition units 340, 344, 345, and 349, an amplification unit Gpd341, an amplification unit Gid342, integrators 343 and 348, an amplification unit Gpq346, an amplification unit Giq347, and a non-interactive control unit 350.

Also, the non-interactive control unit 350 includes Ra parameter units 350-1 and 350-3, an Ld parameter unit 350-6, a $\phi_{aff}$ parameter unit 350-8, an Lq parameter unit 350-11, addition units 350-2, 350-4, 350-7, 350-9, and 350-12, and multiplication units 350-5 and 350-10.

The addition unit 340 calculates deflection $\Delta Id_c$ by subtracting the $d_c$-axis current $Id_c$ output by the first phase conversion unit 320 from the $d_c$-axis current command value $Id_c{}^*$ output by the current command unit 304a. The addition unit 340 outputs the calculated deflection $\Delta Id_c$ to the amplification units Gpd341 and Gid342.

The amplification unit Gpd341 stores a d-axis current control proportional gain. Also, the d-axis current control proportional gain is calculated and stored in advance by a designer of the motor control device 30. The amplification unit Gpd 341 multiplies the deflection $\Delta Id_c$ output by the addition unit 340 by the d-axis current control proportional gain and outputs the multiplied value Gpd×$\Delta Id_c$ to the addition unit 344.

The amplification unit Gid342 stores a d-axis current control integral gain. Also, the d-axis current control integral gain is calculated and stored in advance by the designer of the motor control device 30. The amplification unit Gid 342 multiplies the deflection $\Delta Id_c$ output by the addition unit 340 by the d-axis current control integral gain and outputs the multiplied value Gid×$\Delta Id_c$ to the integrator 343.

The integrator 343 integrates the value Gid×$\Delta Id_c$ output by the amplification unit Gid342 and outputs an integrated value Intgl_$d_c$ (=Gid×Σ($\Delta Id_c$)) to the addition unit 344.

The addition unit 344 adds the value Intgl_$d_c$ output by the integrator 343 and the value Gpd×($\Delta Id_c$) output by the amplification unit Gpd341 and outputs an added value Intgl_$d_c$+Gpd×($\Delta Id_c$) to the non-interactive control unit 350.

The addition unit 345 calculates deflection $\Delta Iq_c$ by subtracting the $q_c$-axis current $Iq_c$ output by the first phase conversion unit 320 from the $q_c$-axis current command value $Iq_c{}^*$ output by the current command unit 304a. The addition unit 345 outputs the calculated deflection $\Delta Iq_c$ to the amplification units Gpq346 and Giq347.

The amplification unit Gpq346 stores a q-axis current control proportional gain. Also, the q-axis current control proportional gain is calculated and stored in advance by the designer of the motor control device 30. The amplification unit Gpq 346 multiplies the deflection $\Delta Iq_c$ output by the addition unit 345 by the q-axis current control proportional gain and outputs the multiplied value Gpq×($\Delta Iq_c$) to the addition unit 349.

The amplification unit Giq347 stores a q-axis current control integral gain. Also, the q-axis current control integral gain is calculated and stored in advance by the designer of the motor control device 30. The amplification unit Giq 347 multiplies the deflection $\Delta Iq_c$ output by the addition unit 345 by the d-axis current control integral gain and outputs the multiplied value Giq×($\Delta Iq_c$) to the integrator 348.

The integrator 348 integrates the value Giq×($\Delta Iq_c$) output by the amplification unit Giq347 and outputs an integrated value Intgl_$q_c$ (=Giq×Σ($\Delta Iq_c$)) to the addition unit 349.

The addition unit 349 adds the value Intgl_q$_c$ output by the integrator 348 and the value Gpq×(ΔIq$_c$) output by the amplification unit Gpd346 and outputs an added value Intgl_q$_c$+Gpq×(ΔIq$_c$) to the non-interactive control unit 350.

Next, each unit of the non-interactive control unit 350 will be described.

The Ra parameter unit 350-1 stores a resistance value of the wiring resistor Ra which is a predetermined value in advance. Also, the resistance value of the wiring resistor Ra is calculated and stored in advance by the designer of the motor control device 30. The Ra parameter unit 350-1 multiplies the q$_c$-axis current command value Iq$_c$* output by the current command unit 304a by the resistance value of the wiring resistor Ra and outputs a multiplied value Ra×Iq$_c$* to the addition unit 350-2.

The addition unit 350-2 adds the value Ra×Iq$_c$* output by the Ra parameter unit 350-1 and the value (Intgl_q$_c$+Gpq×ΔId$_c$) output by the addition unit 349 and outputs an added value (Intgl_q$_c$+Gpq×ΔIq$_c$+Ra×Iq$_c$*) to the addition unit 350-7.

The Ra parameter unit 350-3 stores a resistance value of the wiring resistor Ra which is a predetermined value in advance. The Ra parameter unit 350-3 multiplies the d$_c$-axis current command value Id$_c$* output by the current command unit 304a by the resistance value of the wiring resistor Ra and outputs a multiplied value Ra×Id$_c$* to the addition unit 350-4.

The addition unit 350-4 adds the value Ra×Id$_c$* output by the Ra parameter unit 350-3 and the value (Intgl_d$_c$+Gpd×ΔId$_c$) output by the addition unit 344 and outputs an added value (Intgl_d$_c$+Gpd×ΔId$_c$+Ra×Id$_c$*) to the addition unit 350-12.

The multiplication unit 350-5 multiples the d$_c$-axis current command value Id$_c$* output by the current command unit 304a by the angular velocity ω output by the velocity calculation unit 302 and outputs a multiplied value ωId$_c$* to the Ld parameter unit 350-6.

The Ld parameter unit 350-6 stores a d-axis inductance Ld which is a predetermined value in advance. Also, the d-axis inductance Ld is calculated and stored in advance by the designer of the motor control device 30. The Ld parameter unit 350-6 multiplies the value ωId$_c$* output by the multiplication unit 350-5 by the d-axis inductance Ld and outputs a multiplied value ωLd×Id$_c$* to the addition unit 350-7.

The addition unit 350-7 adds the value ωLd×Id$_c$* output by the Ld parameter unit 350-6 and the value (Intgl_q$_c$+Gpq×ΔIq$_c$+Ra×Iq$_c$*) output by the addition unit 350-2 and outputs an added value (Intgl_q$_c$+Gpq×ΔIq$_c$+Ra×Iq$_c$*+ωLd×Id$_c$*) to the addition unit 350-9.

The ϕ$_{aff}$ parameter unit 350-8 stores the interlinkage magnetic flux Φ$_{aff}$ of the rotor of the motor 10 which is a predetermined value in advance. Also, the interlinkage magnetic flux Φ$_{aff}$ is calculated and stored in advance by the designer of the motor control device 30. The ϕ$_{aff}$ parameter unit 350-8 multiplies the angular velocity ω output by the velocity calculation unit 302 by the interlinkage magnetic flux Φ$_{aff}$ and outputs a multiplied value ωΦ$_{aff}$ to the addition unit 350-9.

The addition unit 350-9 adds the value ωΦ$_{aff}$ output by the ϕ$_{aff}$ parameter unit 350-8 and the value (Intgl_q$_c$+Gpq×ΔIq$_c$+Ra×Iq$_c$*+ωLd×Id$_c$*) output by the addition unit 350-7 and outputs an added value (Intgl_q$_c$+Gpq×ΔIq$_c$+Ra×Iq$_c$*+ωLd×Id$_c$*+ωΦ$_{aff}$) as the q$_c$-axis voltage command value Vq$_c$.

The multiplication unit 350-10 multiplies the angular velocity ω output by the velocity calculation unit 302 by the q$_c$-axis current command value Iq$_c$* output by the current command unit 304a and outputs a multiplied value ωIq$_c$* to the Lq parameter unit 350-11.

The Lq parameter unit 350-11 stores a q-axis inductance Lq which is a predetermined value in advance. Also, the q-axis inductance Lq is calculated and stored in advance by the designer of the motor control device 30. The Lq parameter unit 350-11 multiplies the value ωIq$_c$* output by the multiplication unit 350-10 by the q-axis inductance Lq and outputs a multiplied value ωLq×Iq$_c$* to the addition unit 350-12.

The addition unit 350-12 subtracts the value ωIq$_c$*×Lq output by the Lq parameter unit 350-11 from the value (Intgl_d$_c$+Gpd×ΔId$_c$+Ra×Id$_c$*) output by the addition unit 350-4 and outputs a subtracted value (Intgl_d$_c$+Gpd×ΔId$_c$+Ra×Id$_c$*−ωLq×Iq$_c$*) as the d$_c$-axis voltage command value Vd$_c$.

Next, a relation between the integral value of the current deflection and the voltage command value according to the present embodiment will be described with reference to FIGS. 3 and 4.

In the present embodiment, as will be described below, the motor control device 30a performs control such that the d-axis current Id, the q-axis current Iq, the d$_c$-axis current Id$_c$, and the q$_c$-axis current Id$_c$ become 0 at the time of the offset adjustment.

Therefore, the d-axis voltage Vd and the q-axis voltage Vq are expressed as in the following equation (6) from equation (5).

[Math. 4]

$$\begin{bmatrix} Vd \\ Vq \end{bmatrix} = \begin{bmatrix} 0 \\ \omega \Phi a \end{bmatrix} \tag{6}$$

When equation (6) is substituted into equation (3), the following equation (7) is obtained.

[Math. 5]

$$\begin{bmatrix} 0 \\ \omega \Phi a \end{bmatrix} = \begin{bmatrix} \cos(\Delta\theta') & -\sin(\Delta\theta') \\ \sin(\Delta\theta') & \cos(\Delta\theta') \end{bmatrix} \begin{bmatrix} Vd_c \\ Vq_c \end{bmatrix} \tag{7}$$

The d$_c$-axis voltage Vd$_c$ and the q$_c$-axis voltage Vq$_c$ are expressed as in the following equation (8) from equation (7).

[Math. 6]

$$\begin{bmatrix} Vd_c \\ Vq_c \end{bmatrix} = \begin{bmatrix} \cos(\Delta\theta') & \sin(\Delta\theta') \\ -\sin(\Delta\theta') & \cos(\Delta\theta') \end{bmatrix} \begin{bmatrix} 0 \\ \omega \Phi a \end{bmatrix} \tag{8}$$

$$= \begin{bmatrix} \sin(\Delta\theta') \\ \cos(\Delta\theta') \end{bmatrix} \omega \Phi a$$

Next, since the current PI control unit 307a performs the control such that the current deflection becomes 0 through the PI control in the steady state, the current deflection input to the amplification Gpd341 and the amplification unit Gpq346 is 0. Therefore, the d$_c$-axis voltage Vd$_c$ of the control system coordinates is expressed as in the following equation (9) and the q$_c$-axis voltage Vq$_c$ of the control system coordinates is expressed as in the following equation (10).

$$Vd_c = \text{Intgl}\_d_c + Ra \times Id_c^* - \omega Lq \times Iq_c^* \quad (9)$$

$$Vq_c = \text{Intgl}\_q_c + Ra \times Iq_c^* + \omega Ld \times Id_c^* + \omega \Phi_{aff} \quad (10)$$

In equation (10), $\omega\Phi_{aff}$ indicates an induced voltage subjected to feed forward.

Since the servo is controlled in the ON state at the $d_c$-axis current command value $Id_c^*$ and the $q_c$-axis current command value $Iq_c^*$ to 0 at the time of the offset adjustment, equations (9) and (10) are expressed as in equations (11) and (12).

$$\text{Intgl}\_d_c = Vd_c \quad (11)$$

$$\text{Intgl}\_q_c = Vq_c - \omega\Phi_{aff} \quad (12)$$

When equations (11) and (12) are substituted into equation (8), equations (11) and (12) are expressed as in the following equations (13) and (14).

$$\text{Intgl}\_d_c = \omega\Phi a \times \sin(\Delta\theta') \quad (13)$$

$$\text{Intgl}\_q_c = \omega\Phi a \times \cos(\Delta\theta') - \omega\Phi_{aff} \quad (14)$$

Figure 5:
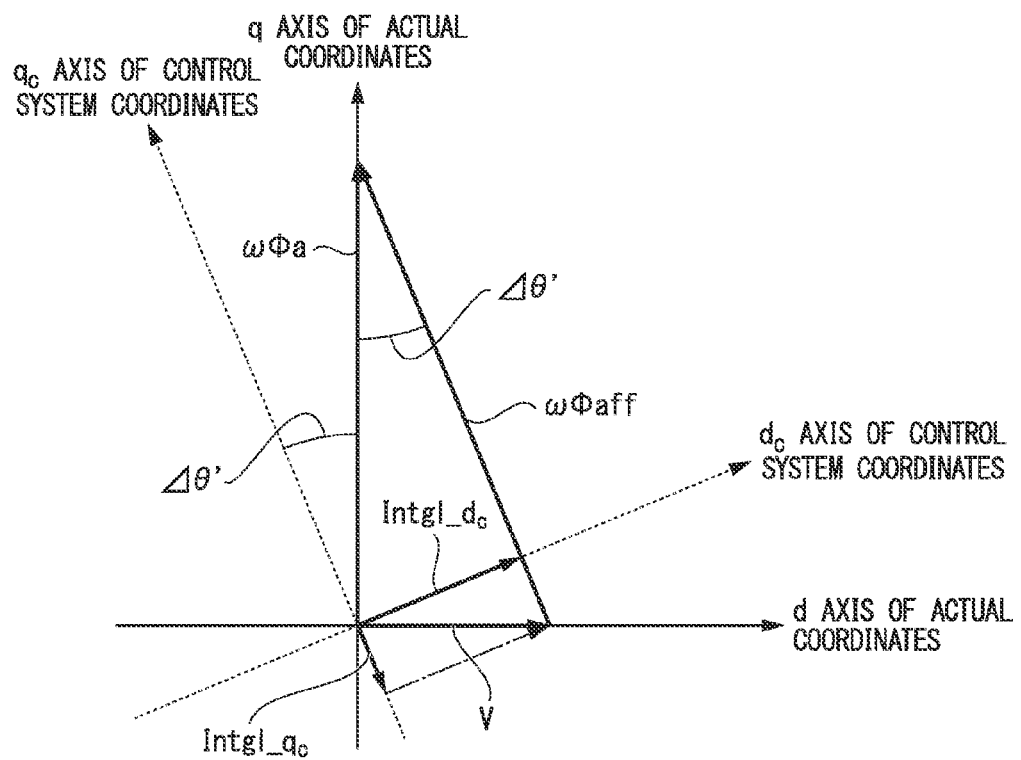
FIG. 5 is a voltage vector diagram by an integral value of current deflection in the dq coordinate system and the $d_c q_c$ coordinates according to the first embodiment.

A relation between equations (13) and (14) is illustrated in FIG. 5. FIG. 5 is a voltage vector diagram by an integral value of current deflection in the dq coordinate system and the $d_c q_c$ coordinates according to the first embodiment.

In the example illustrated in FIG. 5, when there is an error due to assembly of the resolver 20, an error due to manufacturing, an error occurring by delay of the motor control device 30, or the like, a state in which the control system coordinate $q_c$ axis is advanced an angle $\Delta\theta'$ with respect to the actual coordinate q axis is shown.

Figure 6:
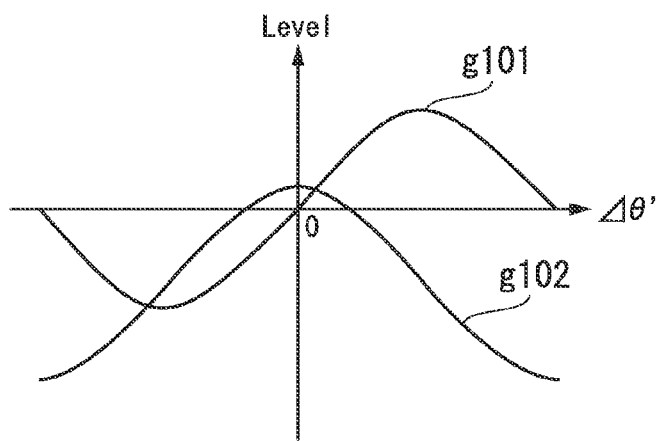
FIG. 6 is a diagram illustrating a variation in an integral value of the current deflection when an offset value Δθ' is varied according to the first embodiment.

FIG. 6 is a diagram illustrating a variation in the integral value of the current deflection when the offset value $\Delta\theta'$ is varied. In FIG. 6, the horizontal axis represents an angle and the vertical axis represents the magnitude of the integral value of the current deflection. A curve g101 indicates a variation in the integral value $\text{Intgl}\_d_c$ of the deflection of the $d_c$-axis current with respect to the offset value $\Delta\theta'$ and a curve g102 indicates a variation in the integral value $\text{Intgl}\_q_c$ of the deflection of the $q_c$-axis current with respect to the offset value $\Delta\theta'$.

In the present embodiment, the user performs the offset adjustment by varying the offset correction value $\Delta\theta$ through the adjustment unit 403 so that the integral value $\text{Intgl}\_d_c$ of the dc-axis current deflection of the control system coordinates is adjusted to 0.

Next, an adjustment procedure of the offset correction value $\Delta\theta$ will be described with reference to FIGS. 3, 4, and 7. Also, the following adjustment of the offset correction value $\Delta\theta$ in the case in which the motor control system 1 is mounted on a vehicle will be described. Also, for the following adjustment of the offset correction value $\Delta\theta$, an example in which the adjustment is performed using the integral value $\text{Intgl}\_d_c$ of the dc-axis current deflection will be described.

Figure 7:
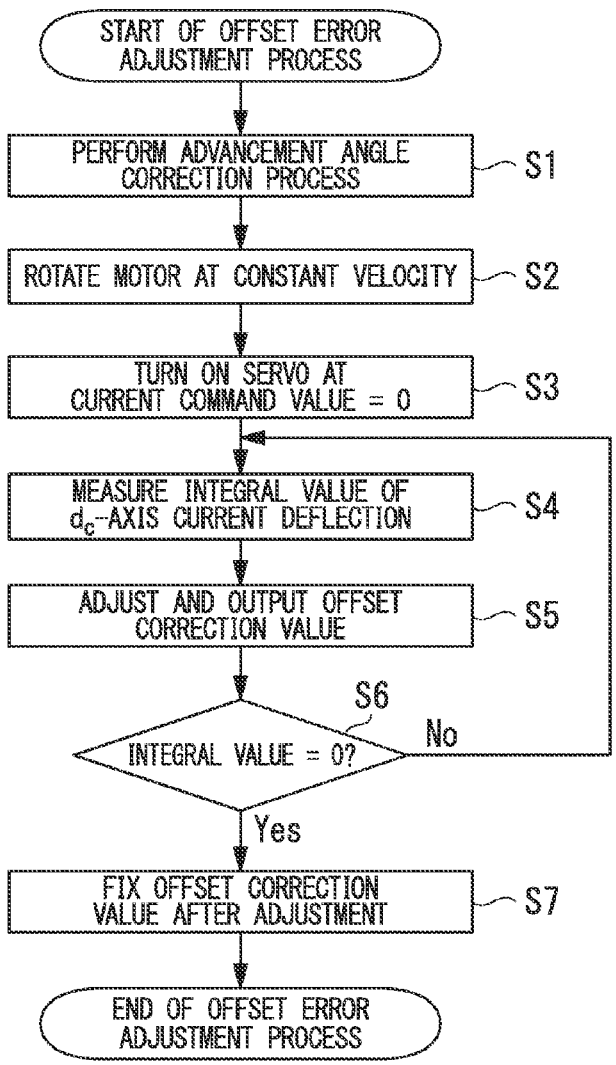
FIG. 7 is a flowchart illustrating an adjustment procedure of an offset correction value according to the first embodiment.

FIG. 7 is a flowchart illustrating the adjustment procedure of the offset correction value according to the present embodiment.

(Step S1) The correction control unit 404a of the offset correction device 40a adjusts an advancement angle corresponding to the influence of delay due to the 2-phase/3-phase conversion unit 308, the power conversion unit 310, or the like by the number of rotations of the motor 10 driven in step S2 in advance. The reason is to prevent an error from occurring in calculation of each value when a delay time is present from the d-axis voltage command value Vd and the q-axis voltage command value Vq to the d-axis voltage Vd and the q-axis voltage Vq. After step S1 ends, the process proceeds to step S2.

(Step S2) The driving control unit 501 of the driving control device 50 rotates the motor 10 through the driving unit 502 at the constant velocity. Specifically, the driving control unit 501 sets an engine (the driving unit 502) of a vehicle to an idling state and rotates the motor 10 at the constant velocity. Next, the driving control unit 501 outputs information indicating a driving state of the motor 10 to the correction control unit 404a. After step S2 ends, the process proceeds to step S3.

(Step S3) When the information indicating the driving state output by the driving control unit 501 is information indicating that the motor 10 is rotated at the constant velocity, the correction control unit 404a sets each of the d-axis current command value Id* and the q-axis current command value Iq* to 0 and controls the servo of the motor control device 30a in the ON state. After step S3 ends, the process proceeds to step S4.

(Step S4) The integral value measurement unit 401a measures the integral value $\text{Intgl}\_d_c$ of the $d_c$-axis current deflection. The integral value measurement unit 401 outputs the measured integral value $\text{Intgl}\_d_c$ of the $d_c$-axis current deflection to the display unit 402a. After step S4 ends, the process proceeds to step S5.

(Step S5) The user adjusts the integral value $\text{Intgl}\_d_c$ of the $d_c$-axis current deflection to 0 through the adjustment unit 403, viewing the value based on the integral value $\text{Intgl}\_d_c$ of the $d_c$-axis current deflection displayed on the display unit 402a or display of a lamp or the like and outputs the adjustment result to the control target 60a.

(Step S6) The user determines whether the integral value $\text{Intgl}\_d_c$ of the $d_c$-axis current deflection becomes 0. When it is determined that the integral value $\text{Intgl}\_d_c$ of the $d_c$-axis current deflection becomes 0 (Yes in step S6), the process proceeds to step S7. When it is determined that integral value $\text{Intgl}\_d_c$ of the $d_c$-axis current deflection does not become 0 (No in step S6), the process returns to step S4.

(Step S7) The correction control unit 404a fixes the offset correction value $\Delta\theta$ after the offset adjustment ends.

Then, the adjustment of the offset correction value ends.

Next, actual measurement results obtained by the motor control system 1 according to the present embodiment will be described with reference to FIGS. 8A, 8B, 9A, and 9B.

Figure 8A:
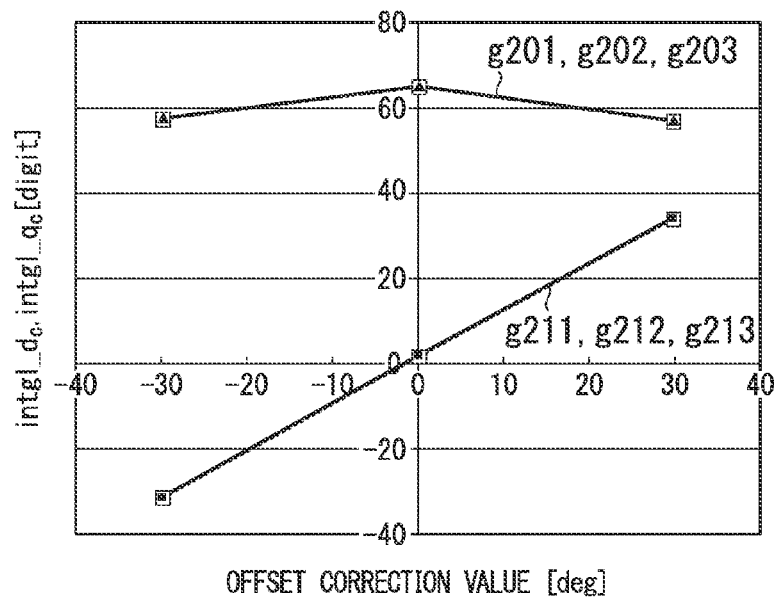
FIG. 8A is a diagram for describing an example of a result obtained by actually measuring an integral value of the current deflection and each voltage when the offset correction value is varied using an actual device according to the first embodiment.
Figure 8B:
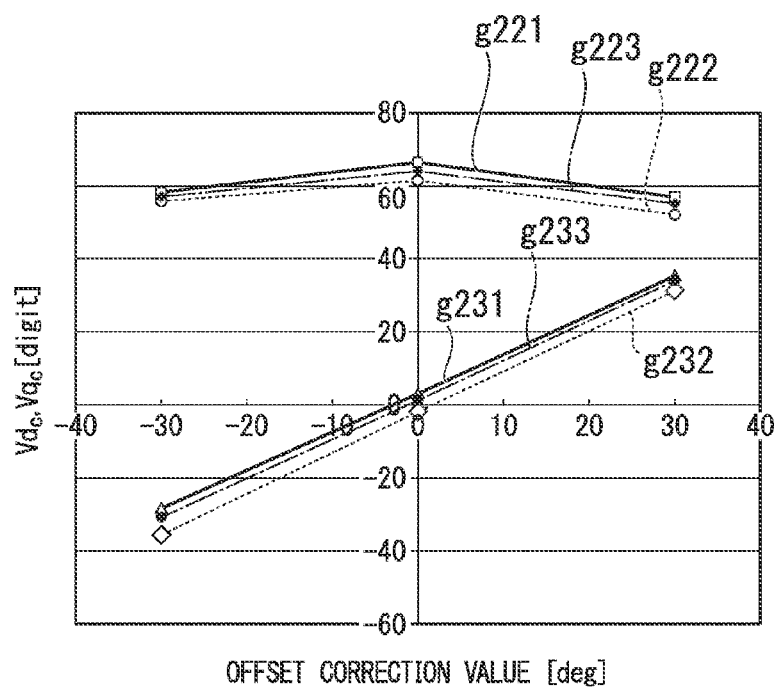
FIG. 8B is a diagram for describing an example of a result obtained by actually measuring an integral value of the current deflection and each voltage when the offset correction value is varied using an actual device according to the first embodiment.
Figure 9A:
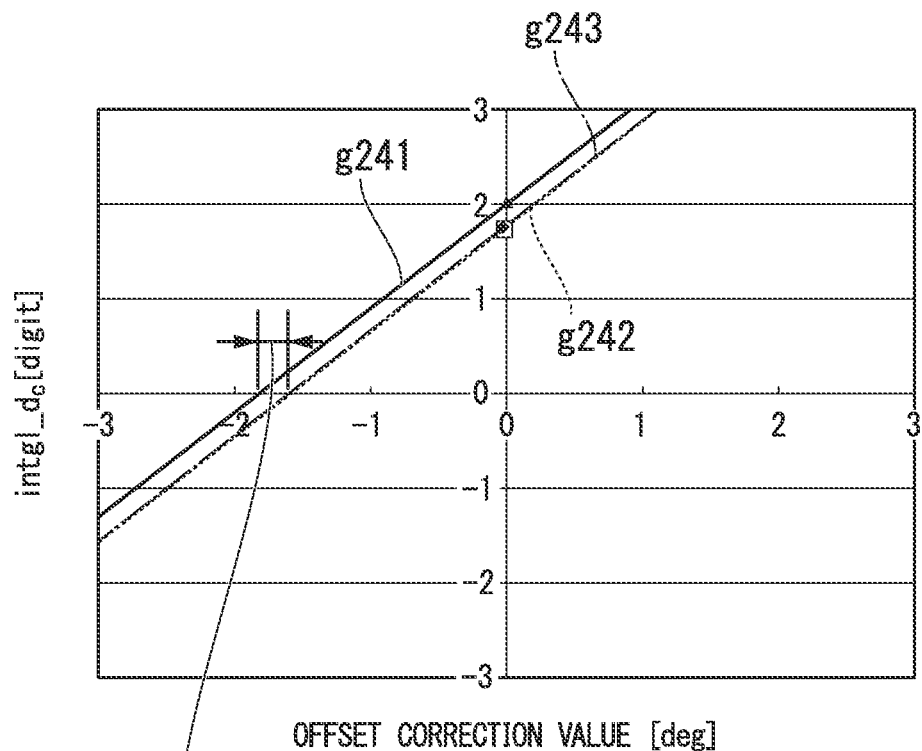
FIG. 9A is an expanded view of a range of the offset correction angle of FIG. 8A from −3 deg to +3 deg.
Figure 9B:
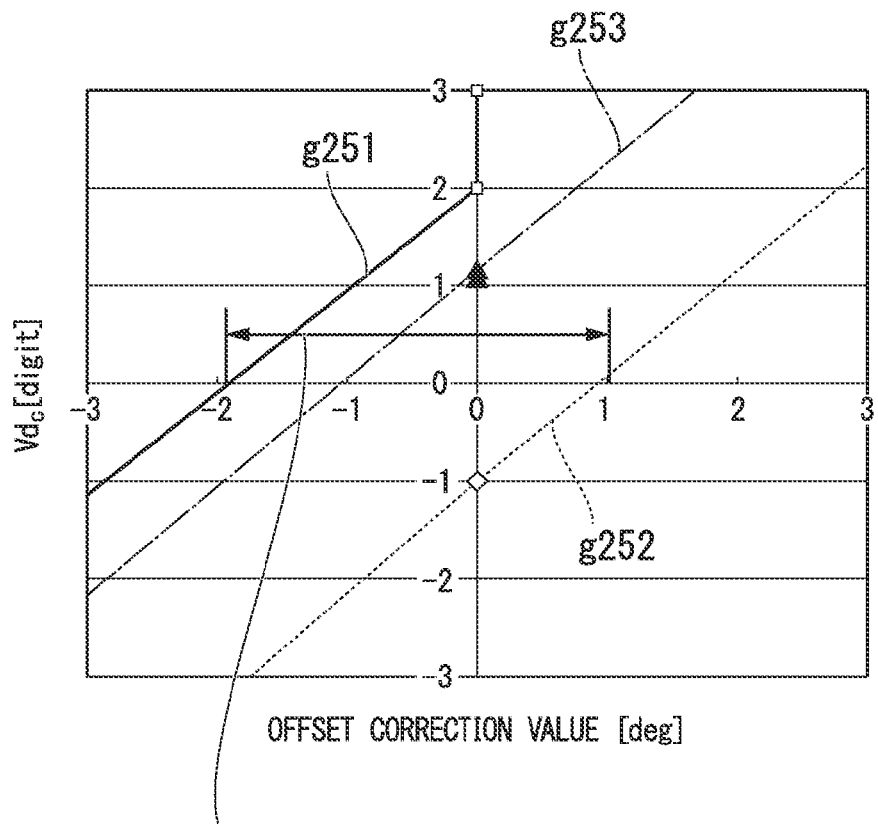
FIG. 9B is an expanded view of a range of the offset correction angle of FIG. 8B from −3 deg to +3 deg.

FIGS. 8A and 8B are diagrams for describing examples of results obtained by actually measuring an integral value of the current deflection and each voltage when the offset correction value is varied using an actual device according to the first embodiment. FIGS. 9A and 9B are expanded views of ranges of the offset correction angles of FIGS. 8A and 8B from −3 deg to +3 deg.

<<Actual Measurement Method>>

Procedure 1: The motor is rotated at +500 [rpm] from the outside and internal data of the motor control device 30b is measured a plurality of times when the d-axis current command value and the q-axis current command value are each 0. The maximum value, the minimum value, and the average value of respective data are calculated based on the measured data.

Procedure 2: The offset correction value is set to −30 [deg], the motor is rotated at +500 [rpm] from the outside, and internal data of the motor control device 30b is measured a plurality of times when the d-axis current command value and the q-axis current command value are each 0. The maximum value, the minimum value, and the average value of respective data are calculated based on the measured data.

Procedure 3: The offset correction value is set to +30 [deg], the motor is rotated at +500 [rpm] from the outside, and internal data of the motor control device 30b is measured a plurality of times when the d-axis current command value and the q-axis current command value are each 0. The maximum value, the minimum value, and the average value of respective data are calculated based on the measured data.

First, the actual measurement results when the offset correction value is the initial state (0) will be described with reference to FIGS. 8A and 9A.

FIGS. 8A and 9A show the actual measurement results of an integral value Intgl_$Id_c$ of the $d_c$-axis current deflection and an integral value Intgl_$Iq_c$ of the $q_c$-axis current deflection measured in Procedures 1 to 3. That is, FIGS. 8A and 9A show graphs indicating relations among the maximum values, the minimum values, and the average values of the integral value Intgl_$Id_c$ of the $d_c$-axis current deflection and the integral value Intgl_$Iq_c$ of the $q_c$-axis current deflection when the offset correction value is −30 [deg], 0 [deg], and +30 [deg].

In FIGS. 8A and 9A, the horizontal axis represents the offset correction value and the vertical axis represents the magnitudes of the integral value of the $d_c$-axis current deflection and the integral value of the $q_c$-axis current deflection. In FIG. 8A, a curve g201 indicates the maximum value of the integral value Intgl_$Iq_c$+$\omega\Phi_{aff}$ of the $q_c$-axis current deflection, a curve g202 indicates the minimum value of the integral value Intgl_$Iq_c$+$\omega\Phi_{aff}$ of the $q_c$-axis current deflection, and a curve g203 indicates the average value of the integral values Intgl_$Iq_c$+$\omega\Phi_{aff}$ of the $q_c$-axis current deflection.

Also, in FIGS. 8A and 9A, a curve g211 indicates the maximum value of the integral values Intgl_$Id_c$ of the $d_c$-axis current deflection, a curve g212 indicates the minimum value of the integral values Intgl_$Id_c$ of the $d_c$-axis current deflection, and a curve g213 indicates the average value of the integral values Intgl_$Id_c$ of the $d_c$-axis current deflection.

As illustrated in FIG. 9A, the average value of the offset correction value is about −1.7 [deg] when the integral value Intgl_$Id_c$ of the $d_c$-axis current deflection=0. This value is a value by which +1.7 [deg] which is an offset of an actual device is exactly corrected. Also, as indicated by an arrow g244, when the integral value Intgl_$Id_c$ of the $d_c$-axis current deflection=0, a difference in the offset correction value between the maximum value and the minimum value of the integral value Intgl_$Id_c$ of the $d_c$-axis current deflection is small, that is, a variation is small. The difference in the offset correction value is small between the maximum value and the minimum value of the integral values Intgl_Idc of the dc-axis current deflection because the variation in the offset correction value is small without receiving an influence of noise or harmonics since only a value of the integrator 343 of the current PI control unit 307a is used. Since the noise or the harmonics contained in the dc-axis voltage Vdc are superimposed on the detection current controlled to 0, in particular, the amplification unit Gpd341 amplifies the noise or the harmonics of the detection current. On the other hand, the integrator 343 attenuates the noise or the harmonics. Also, the current command value is set to 0, and thus there is no problem even when non-interactive control other than $\omega\Phi_{aff}$ or a component of the proportional control of the amplification unit Gpd341 is omitted in the steady state of the constant velocity.

Next, the actual measurement results of the $d_c$-axis voltage $Vd_c$ will be described for reference with reference to FIGS. 8B and 9B.

FIGS. 8B and 9B show results obtained by actually measuring the $d_c$-axis voltage $Vd_c$ and the $q_c$-axis voltage $Vq_c$ in Procedures 1 to 3. That is, FIGS. 8B and 9B show graphs indicating relations among the maximum values, the minimum values, and the average values of the $d_c$-axis voltages $Vd_c$ and the $q_c$-axis voltages $Vq_c$ when the offset correction value is −30 [deg], 0 [deg], and +30 [deg]. In FIGS. 8B and 9B, the horizontal axis represents the offset correction value and the vertical axis represents the $d_c$-axis voltage and the $q_c$-axis voltage.

Also, in FIG. 8B, a curve g221 indicates the maximum value of the $q_c$-axis voltage $Vq_c$, a curve g222 indicates the minimum value of the $q_c$-axis voltage $Vq_c$, and a curve g223 indicates the average value of the $q_c$-axis voltage $Vq_c$.

Also, in FIGS. 8B and 9B, a curve g231 indicates the maximum value of the $d_c$-axis voltage $Vd_c$, a curve g232 indicates the minimum value of the $d_c$-axis voltage $Vd_c$, and a curve g233 indicates the average value of the $d_c$-axis voltage $Vd_c$.

As illustrated in FIG. 9B, when the dc-axis voltage $Vd_c$=0, the average value of the offset correction values is about −1.0 [deg]. In this case, in correction of +1.7 [deg] which is an offset of an actual device, an error of +0.7 [deg] remains. Further, as indicated by an arrow g254, a difference in the offset correction value between the maximum value and the minimum value of the $d_c$-axis voltage $Vd_c$ is large, that is, is irregular when the dc-axis voltage $Vd_c$=0. The difference between the maximum value and the minimum value of the $d_c$-axis voltage $Vd_c$ is large because the offset correction value is irregular since the $d_c$-axis voltage $Vd_c$ is easily affected by noise or harmonics.

As described with reference to FIGS. 8A, 8B, 9A, and 9B, the motor control system according to the present embodiment measures the integral value of the $d_c$-axis current deflection and the user performs the adjustment so that the integral value of the $d_c$-axis current deflection becomes 0.

As a result, since the influence of the noise or harmonics is suppressed compared to the case in which the offset correction value is set and corrected so that the $d_c$-axis voltage $Vd_c$ becomes 0, the irregularity of the offset correction value can also be suppressed, and thus the offset error can be suppressed with high precision.

In the motor control system 1 according to the present embodiment, as described above, when the motor 10 is rotated at the constant velocity from the outside, the motor control device 30 performs the PI control such that the current command values of the d and q axes become 0 and controls the servo of the motor 10 in the ON state. At this time, the offset correction device 40 measures the integral value of the d-axis current deflection and the user adjusts the offset correction value so that the measured integral value of the d-axis current deflection becomes 0.

As a result, since the integral value of the d-axis current deflection rarely affected by the noise or the harmonics is measured and the offset adjustment is performed, the influence of the noise or the harmonics is suppressed and the offset error can be suppressed with high precision.

In the present embodiment, the example in which the user performs the adjustment through the adjustment unit 403, viewing the display of the display unit 402 has been described, but the present invention is not limited thereto. When the motor 10 is rotated at the constant velocity, the correction control unit 404 varies the offset correction value in the range of, for example, −30 [deg] to +30 [deg]. Then, the integral value measurement unit 401 may measure the integral value of the d-axis current deflection at this time and the correction control unit 404 may adjust the offset correction value so that the measured integral value of the d-axis current deflection becomes 0 or is within a range determined in advance.

In the present embodiment, the example in which the integral value measurement unit 401 of the offset correction device 40 measures the integral value Intgl_d of the d-axis current deflection which is the internal data of the current PI control unit 307 has been described, but the present invention is not limited thereto. The integral value measurement unit 401 may measure only the integral value Intgl_q of the q-axis current deflection or both of the integral value Intgl_d of the d-axis current deflection and the integral value Intgl_q of the q-axis current deflection.

In this case, the integral value measurement unit 401 outputs only the measured integral value Intgl_q of the q-axis current deflection or both of the integral value Intgl_d of the d-axis current deflection and the integral value Intgl_q of the q-axis current deflection to the display unit 402. Then, based on a value displayed on the display unit 402 or a lighting state or the like of a lamp, the user may perform adjustment through the adjustment unit 403 so that the integral value Intgl_q of the q-axis current deflection becomes the maximum value.

The display unit 402 may display the value of the integral value Intgl_q of the q-axis current deflection or may measure and set a range of the maximum value in advance and turn on a lamp indicating determination of OK when the integral value Intgl_q of the q-axis current deflection falls within the set range.

[Second Embodiment]

In a second embodiment, an example of a method of adjusting an offset correction value through automatic adjustment will be described.

Figure 10:
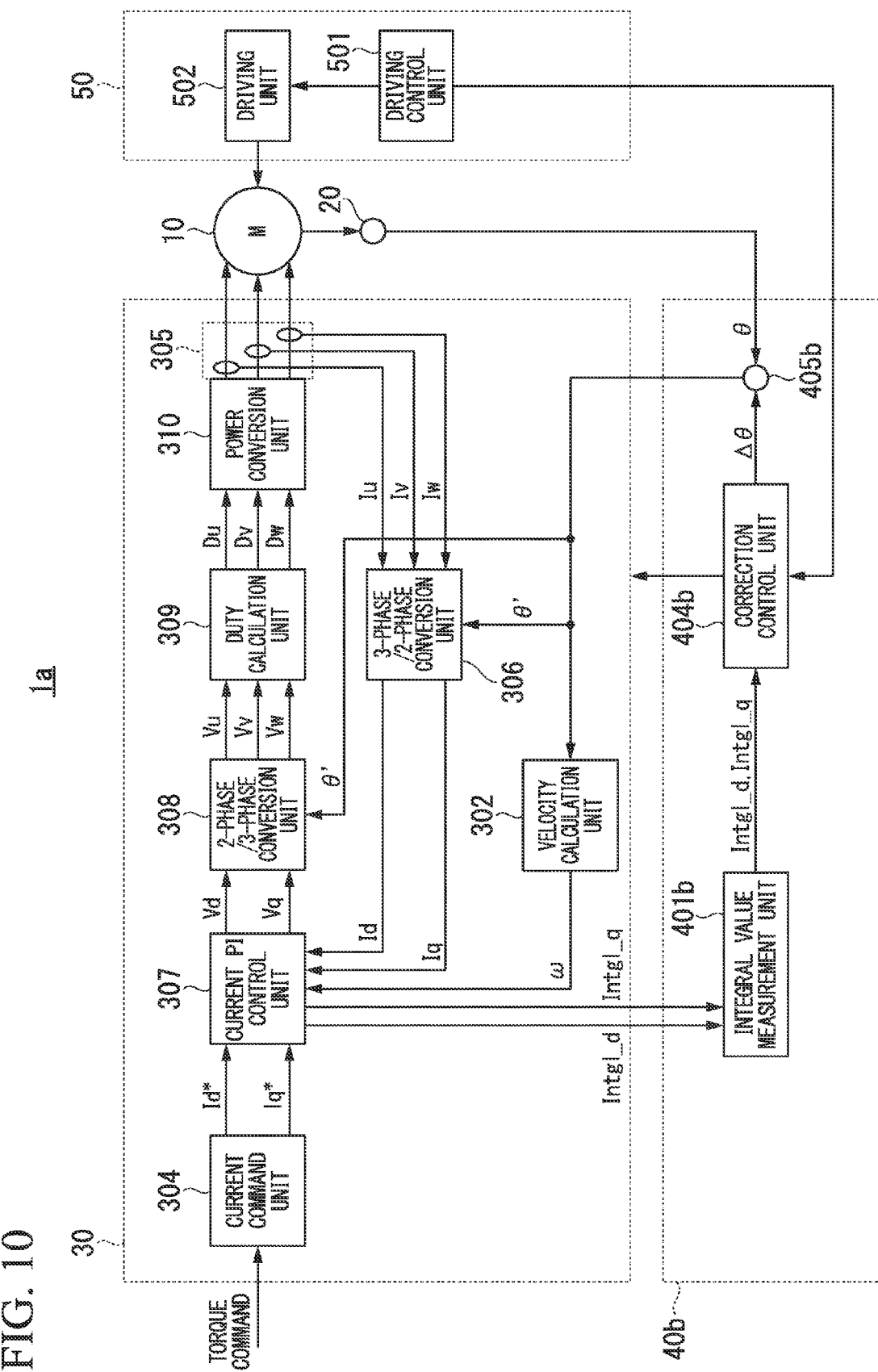
FIG. 10 is a control block diagram illustrating a motor control device according to a second embodiment.

FIG. 10 is a control block diagram illustrating a motor control system 1a according to the present embodiment.

The same reference numerals are given to functional units having the same function as those of the motor control system 1 according to the first embodiment, and the description thereof will be omitted.

A difference from the motor control system 1 is an offset correction device 40b. As illustrated in FIG. 10 the offset correction device 40b includes an integral value measurement unit 401b, a correction control unit 404b, and an addition unit 405b.

The integral value measurement unit 401b measures the integral value Intgl_d of the d-axis current deflection and the integral value Intgl_q of the q-axis current deflection which are internal data of the current PI control unit 307. The integral value measurement unit 401b outputs the measured integral value Intgl_d of the d-axis current deflection and the measured integral value Intgl_q of the q-axis current deflection to the correction control unit 404b.

Based on the information indicating the driving state output by the driving control device 50, the correction control unit 404b determines whether the motor 10 is rotated at the constant velocity by the driving control device 50. When the correction control unit 404 determines that the motor 10 is rotated at the constant velocity, the correction control unit 404 fixes each of the d-axis current command value Id and the q-axis current command value Iq of the motor control device 30 to 0 and performs control such that the servo enters the ON state.

Also, the correction control unit 404b controls the offset correction value such that the integral value Intgl_d of the d-axis current deflection becomes 0 through the PI control of deflection between the integral value Intgl_d of the d-axis current deflection output by the integral value measurement unit 401b and 0. For example, the correction control unit 404b performs control such that the offset correction value becomes convergent by repeating subtraction of the offset correction value when the integral value Intgl_d of the d-axis current deflection is positive and addition of the offset correction value when the integral value Intgl_d of the d-axis current deflection is negative.

Next, an adjustment procedure of the offset correction value $\Delta\theta$ will be described with reference to FIGS. 10 and 11. Also, the following adjustment of the offset correction value $\Delta\theta$ in the case in which the motor control system 1a is mounted on a vehicle will be described. Also, the following adjustment of the offset correction value $\Delta\theta$ in an example in which the adjustment is performed using the integral value Intgl_d of the d-axis current deflection will be described.

Figure 11:
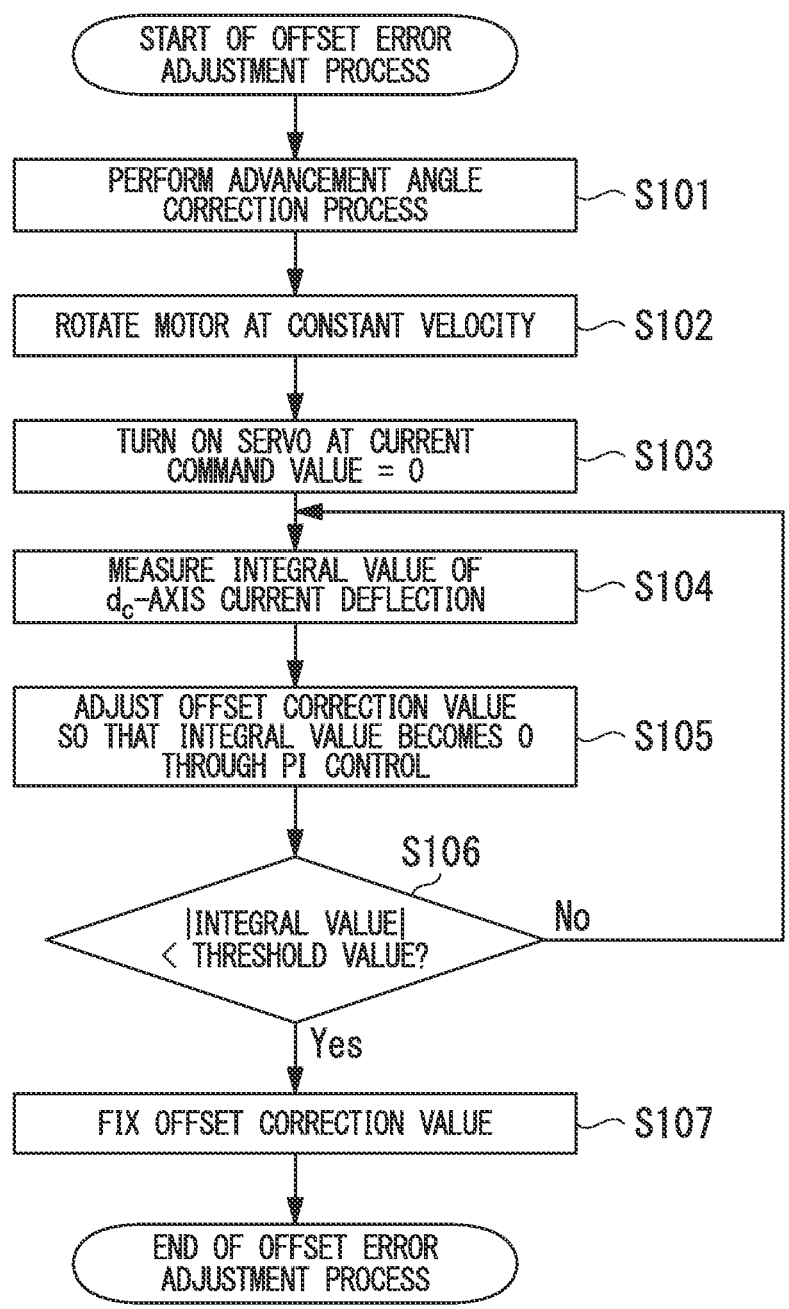
FIG. 11 is a flowchart illustrating an adjustment procedure of an offset correction value according to the second embodiment.

FIG. 11 is a flowchart illustrating the adjustment procedure of the offset correction value according to the present embodiment.

(Steps S101 to S103) Steps S101 to S103 are performed in the same way as steps S1 to S3 (FIG. 7) of the first embodiment.

(Step S104) The integral value measurement unit 401b measures the integral value Intgl_d of the d-axis current deflection. The integral value measurement unit 401 outputs the measured integral value Intgl_d of the d-axis current deflection to the correction control unit 404b. After step S104 ends, the process proceeds to step S105.

(Step S105) The correction control unit 404b performs the PI control on the deflection between the integral value Intgl_d of the d-axis current deflection output by the integral value measurement unit 401b and 0, outputs the offset correction value $\Delta\theta$ to the control target 60a, and performs control such that the integral value Intgl_d of the d-axis current deflection becomes 0.

(Step S106) The correction control unit 404b determines whether the absolute value of the integral value Intgl_d of the d-axis current deflection is equal to or less than a threshold value determined in advance. When it is determined that the absolute value of the integral value Intgl_d of the d-axis current deflection is equal to or less than the threshold value determined in advance, that is, the integral value Intgl_d of the d-axis current deflection becomes convergent (Yes in step S106), the process proceeds to step S107. When it is determined that the absolute value of the integral value Intgl_d of the d-axis current deflection is not equal to or less than the threshold value determined in advance (No in step S106), the process returns to step S104.

(Step S107) The correction control unit 404b fixes the offset correction value $\Delta\theta$ after the end of the offset adjustment.

Then, the adjustment of the offset correction value ends.

In the motor control system 1a according to the present embodiment, as described above, when the motor 10 is rotated at the constant velocity from the outside, the motor control device 30 performs the PI control such that the current command values of the d and q axes become 0 and performs the control such that the servo of the motor 10 enters the ON state. At this time, the offset correction device 40b measures the integral value of the d-axis current deflection and adjusts the offset correction value so that the measured integral value of the d-axis current deflection becomes 0.

As a result, it is possible to automatically adjust the offset correction value with high precision in addition to the advantageous effects of the first embodiment.

[Third Embodiment]

In the second embodiment, the example in which the offset correction value is adjusted such that the integral value of the d-axis current deflection becomes 0 through the PI control has been described. In a third embodiment, however, another adjustment method will be described.

In the third embodiment, the offset correction device 40b sets at least two offset correction values and measures an integral value of d-axis current deflection at the time of the set offset correction value.

The correction control unit 404b interpolates the measured integral value of the d-axis current deflection and calculates an approximate formula. For example, in FIGS. 8A and 8B, when the curve g211 is subjected to straight-line approximation, "y=1.0833x+1.75" is obtained. Here, x is the offset correction value and x is the integral value of the d-axis current deflection.

Next, the correction control unit 404b calculates the offset correction value so that the integral value of the d-axis current deflection becomes 0 using the calculated approximate formula.

In the motor control system according to the present embodiment, as described above, the approximate formula is calculated using the integral value of the d-axis current deflection at the time of the two or more set offset correction values and the offset correction value is calculated using the calculated approximate formula.

As a result, the motor control system according to the present embodiment can calculate the offset correction value with a small number of adjustments.

Also, in the third embodiment, the offset correction device 40b may measure the integral value of the q-axis current deflection and perform the adjustment using the measured value. In this case, for example, the correction control unit 404b may calculate a quadratic approximate formula using the integral value of the q-axis current deflection at the time of the two or more set offset correction values and calculate the offset correction value which is the maximum value from the calculated approximate formula.

Also, in the first to third embodiments, when the offset error is large, a control system in the motor control device becomes unstable. Thus, when the offset error is great, an assembly failure, a wiring fault, or the like of the resolver may occur. For this reason, in the first to third embodiments, it may be detected whether the offset error is greater than a predetermined value (for example, 90 degrees) by a known technology, and the motor and the resolver may be detected for removal in advance.

Also, to realize the functions of the units in FIGS. 1, 4, and 10 of the embodiment, the functions may be executed by a program stored also in a ROM, an HDD, or the like connected to a CPU of a computer system. Alternatively, the functions may be realized by hardware using a programmable logic device (PLD), an application specific integrated circuit (ASIC), or a circuit.

INDUSTRIAL APPLICABILITY

Since the present invention is applicable broadly to a motor control device and a motor control method, the integral value of the current deflection is measured when the motor is rotated at the constant velocity, the correction value at the rotation position of the motor is adjusted based on the measured integral value of the current deflection, and the rotation of the motor is controlled using the adjusted correction value. Thus, even when the detected rotation position deviates, the motor can be controlled with high precision.

DESCRIPTION OF THE REFERENCE SYMBOLS

1, 1a Motor control system
10 Motor
20 Resolver
30, 30a Motor control device
40, 40a, 40b Offset correction device
50 Driving control device
302 Velocity calculation unit
304, 304a Current command unit
305 Current detector
306 3-phase/2-phase conversion unit
307, 307a Current PI control unit
308 2-phase/3-phase conversion unit
309 Duty calculation unit
310 Power conversion unit
320 First phase conversion unit
321 Second phase conversion unit
322 Motor voltage equation unit
323 Addition unit
343, 348 Integrator
401, 401a, 401b Integral value measurement unit
402, 402a Display unit
403 Adjustment unit
404, 404a, 404b Correction control unit
405, 405a, 405b Addition unit
501 Driving control unit
502 Driving unit

The invention claimed is:

1. A motor control device generating a voltage command value from a current command value and performing feedback control using a detection current flowing in a motor, the motor control device comprising:
    a correction control unit configured to set a d-axis current command value and a q-axis current command value to 0 when the motor is rotated at a constant velocity;
    a current control unit configured to generate at least one of (i) an integral value of d-axis current deflection between the d-axis current command value and a detection current of the d-axis and (ii) an integral value of q-axis current deflection between the q-axis current command value and a detection current of the q-axis; and
    an integral value measurement unit configured to measure the generated integral value,
    wherein the correction control unit is configured to adjust a correction value at a rotation position of the motor by performing adjustment so that the measured integral value becomes a value within a range determined in advance,
    wherein the integral value measurement unit is configured to measure the integral value at a time of generating the correction value for the adjustment,
    wherein the correction control unit is configured to (i) generate at least two correction values for the adjustment, (ii) calculate an approximate formula based on the integral value of each of the at least two correction values for the adjustment, and (iii) calculate the correction value at the rotation position of the motor using the calculated approximate formula.

2. The motor control device according to claim 1,
    wherein the correction control unit is configured to generate a value indicating the rotation position by adding the adjusted correction value and a detection value corresponding to the rotation position of the motor, and wherein, based on the generated value indicating the rotation position, the current control unit is configured to perform control.

3. The motor control device according to claim 1, wherein the correction control unit is configured to perform control such that the integrated value of d-axis current deflection between the measured integral values becomes 0 by performing proportional integral control on deflection between the integral value of the d-axis current deflection and 0.

4. The motor control device according to claim 1, wherein the correction control unit is configured to perform advancement angle correction of a dq coordinate system before the calculation of the correction value at the rotation position of the motor by the number of times the motor is rotated at the constant velocity.

5. The motor control device according to claim 2, wherein the correction control unit is configured to perform control such that the integrated value of d-axis current deflection between the measured integral values becomes 0 by performing proportional integral control on deflection between the integral value of the d-axis current deflection and 0.

6. A motor control method of a motor control device generating a voltage command value from a current command value and performing feedback control using a detection current flowing in a motor, the motor control method comprising:

a correction control procedure of setting, by a correction control unit, a d-axis current command value and a q-axis current command value to 0 when the motor is rotated at a constant velocity;

a current control procedure of generating, by a current control unit, at least one of (i) an integral value of d-axis current deflection between the d-axis current command value and the detection current of the d-axis and (ii) an integral value of q-axis current deflection between the q-axis current command value and the detection current of the q-axis;

an integral value measurement procedure of measuring, by an integral value measurement unit, the generated integral value; and an adjusting procedure of adjusting, by the correction control unit, a correction value at a rotation position of the motor by performing adjustment so that the measured integral value becomes a value within a range determined in advance, wherein the integral value measurement procedure measures the integral value at a time of generating the correction value for the adjustment, and wherein the adjusting procedure includes (i) generating at least two correction values for the adjustment, (ii) calculating an approximate formula based on the integral value of each of the at least two correction values for the adjustment, and (iii) calculating the correction value at the rotation position of the motor using the calculated approximate formula.

* * * * *